United States Patent
Prince et al.

(10) Patent No.: US 10,205,674 B2
(45) Date of Patent: *Feb. 12, 2019

(54) INCORPORATING WEB APPLICATIONS INTO WEB PAGES AT THE NETWORK LEVEL

(71) Applicant: Cloudflare, Inc., San Francisco, CA (US)

(72) Inventors: Matthew Browning Prince, San Francisco, CA (US); Matthieu Philippe François Tourne, San Francisco, CA (US); Christopher Stephen Joel, Richmond, CA (US); John Brinton Roberts, San Francisco, CA (US); Michael Jonas Sofaer, San Francisco, CA (US); Jason Thomas Walter Benterou, Burlingame, CA (US)

(73) Assignee: CLOUDFLARE, INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/503,297

(22) Filed: Sep. 30, 2014

(65) Prior Publication Data

US 2015/0019679 A1    Jan. 15, 2015

Related U.S. Application Data

(63) Continuation of application No. 13/474,529, filed on May 17, 2012, now Pat. No. 8,849,904.

(51) Int. Cl.
*G06F 15/16* (2006.01)
*H04L 12/911* (2013.01)
(Continued)

(52) U.S. Cl.
CPC ............... *H04L 47/70* (2013.01); *G06F 8/61* (2013.01); *H04L 67/02* (2013.01);
(Continued)

(58) Field of Classification Search
CPC ............... H04L 67/02; H04L 67/2814; H04L 29/12066; H04L 63/0281; G06C 20/12;
(Continued)

(56) References Cited

U.S. PATENT DOCUMENTS 6,453,335 B1    9/2002   Kaufmann
7,010,581 B2 *  3/2006   Brown ................. G06F 3/0481
                                                         707/E17.121
(Continued)

OTHER PUBLICATIONS

Squarespace Features Section, "Squarespace.com Features", Mar. 25, 2012, via Wayback Machine: http://web.archive.org/web/20100325004552/http://www.squarespace.com/features/).*

(Continued)

*Primary Examiner* — Edward Kim
(74) *Attorney, Agent, or Firm* — Nicholson De Vos Webster & Elliott LLP (57) ABSTRACT

A proxy server automatically includes web applications in web pages at the network level. The proxy server receives, from a client device, a request for a network resource at a domain and is hosted at an origin server. The proxy server retrieves the requested network resource. The retrieved network resource does not include the web applications. The proxy server determines that the web applications are to be installed within the network resource. The proxy server automatically modifies the retrieved network resource to include the web applications. The proxy server transmits a response to the client device that includes the modified network resource. The network resource may remain unchanged at the origin server.

26 Claims, 5 Drawing Sheets

(51) Int. Cl.
H04L 29/08 (2006.01)
G06F 8/61 (2018.01)
H04L 29/06 (2006.01)

(52) U.S. Cl.
CPC .......... H04L 67/2823 (2013.01); H04L 67/34 (2013.01); H04L 67/42 (2013.01)

(58) Field of Classification Search
CPC ............. G06C 30/0277; G06F 17/3089; G06F 17/30557; G06F 17/30893; H04W 4/00; H04W 4/02
USPC ................................ 709/246, 200, 217–219
See application file for complete search history.

(56) References Cited

U.S. PATENT DOCUMENTS

| | | | | |
|---|---|---|---|---|
| 7,020,685 | B1* | 3/2006 | Chen | H04W 88/02 455/403 |
| 7,363,248 | B2* | 4/2008 | Rollins | G06Q 20/02 705/14.65 |
| 7,904,953 | B2* | 3/2011 | Meyer | G06F 12/1466 713/193 |
| 7,953,820 | B2* | 5/2011 | Stevens | G06F 17/30902 709/219 |
| 8,150,939 | B1* | 4/2012 | Murray | G06F 17/30896 709/203 |
| 8,504,911 | B1 | 8/2013 | Thakare et al. | |
| 9,342,620 | B2 | 5/2016 | Joel et al. | |
| 9,369,437 | B2 | 6/2016 | Holloway et al. | |
| 2002/0103712 | A1* | 8/2002 | Rollins | G06Q 20/02 705/26.8 |
| 2002/0120782 | A1* | 8/2002 | Dillon | H04L 29/12066 709/246 |
| 2002/0133604 | A1* | 9/2002 | Khanna | G06F 21/6236 709/229 |
| 2004/0073713 | A1* | 4/2004 | Pentikainen | G06F 17/30873 709/249 |
| 2004/0215717 | A1* | 10/2004 | Seifert | G06F 17/30899 709/203 |
| 2005/0138122 | A1* | 6/2005 | Boehringer | G06F 17/30873 709/205 |
| 2005/0188361 | A1 | 8/2005 | Cai et al. | |
| 2006/0184640 | A1* | 8/2006 | Hatch | G06F 17/3087 709/217 |
| 2006/0271671 | A1* | 11/2006 | Hansen | G06F 17/30899 709/224 |
| 2006/0294199 | A1* | 12/2006 | Bertholf | G06F 17/30893 709/217 |
| 2007/0067415 | A1* | 3/2007 | Kawaguchi | G01C 21/3697 709/217 |
| 2008/0077851 | A1 | 3/2008 | Hesmer et al. | |
| 2008/0077980 | A1* | 3/2008 | Meyer | G06F 12/1466 726/12 |
| 2008/0172488 | A1* | 7/2008 | Jawahar | G06F 17/30902 709/225 |
| 2008/0263144 | A1* | 10/2008 | Rollins | G06Q 20/02 709/203 |
| 2009/0248790 | A1* | 10/2009 | Webb-Johnson | H04L 29/12066 709/202 |
| 2009/0248855 | A1* | 10/2009 | Nastacio | G06F 17/30536 709/224 |
| 2010/0011341 | A1* | 1/2010 | Baierl | G06F 11/3636 717/110 |
| 2010/0057830 | A1* | 3/2010 | Takala | H04W 4/02 709/203 |
| 2010/0198938 | A1* | 8/2010 | Molland | H04L 29/08846 709/217 |
| 2010/0318976 | A1* | 12/2010 | Everly | H04L 67/22 717/141 |
| 2011/0055683 | A1* | 3/2011 | Jiang | G06F 17/30899 715/234 |
| 2011/0072116 | A1* | 3/2011 | Kordun | G06F 17/3089 709/219 |
| 2011/0137973 | A1* | 6/2011 | Wei | H04L 67/1008 709/202 |
| 2011/0307238 | A1* | 12/2011 | Scoda | G06F 17/30905 703/26 |
| 2011/0314091 | A1* | 12/2011 | Podjarny | G06F 17/30905 709/203 |
| 2013/0204746 | A1 | 8/2013 | Lee et al. | |
| 2013/0218954 | A1* | 8/2013 | Kaegi | G06F 17/3089 709/203 |
| 2013/0238977 | A1 | 9/2013 | Abrahami et al. | |

OTHER PUBLICATIONS

Roggio, "How to Make and Place a Widget on Websites", May 18, 2007, http://voices.yahoo.com/how-place-widget-websites-343192.html?cat=35.*

Wayback (Wayback archive of "10 Must-Have Google Chrome Extensions" from http://googlesystem.blogspot.com/2010/01/10-must-have-google-chrome-extensions.html Jan. 26, 2010. Wayback archive dated Jan. 29, 2010 from https://web.archive.org/web/20100129034455/http://googlesystem.blogspot.com/2010/01/10-must-have-google-chrome-extensions.html).*

"Squarespace.com Features," Squarespace Features Section, Mar. 25, 2012, via Wayback Machine:http://web.archive.org/web/20100325004552/http://www.squarespace.com/features/, 10 pages.

Roggio, "How to Make and Place a Widget on Websites," May 18, 2007, downloaded at http://voices.yahoo.com/how-place-widget-websites-343192.html?cat=35, 5 pages.

Blackbird Technologies Opposition to Cloudflare's motion for Judgment on the Pleadings under 35 U.S.C. 101 (ECF No. 37), Document 77, *Blackbird Tech LLC*, v. *Cloudflare, Inc.*, Case No. 3:17-cv-06112-VC, United States District Court Northern District of California, Dec. 22, 2017, 20 pages.

Cloudflare's Opening Brief Supporting Motion for Judgment on the Pleadings under 35 U.S.C. 101, Document 38, *Blackbird Tech LLC d/b/a Blackbird Technologies*, v. *Cloudflare, Inc.*, Case No. 3:17-cv-06112-VC, United States District Court for the District of Delaware, Sep. 18, 2017, 16 pages.

Cloudflare's Reply Supporting Motion for Judgment on the Pleadings under 35 U.S.C. 101, Document 78, *Blackbird Tech LLC*, v. *Cloudflare, Inc.*, Case No. 3:17-cv-06112-VC, United States District Court Northern District of California, Jan. 3, 2018, 11 pages.

Defendant's Opening Brief in Support of its Motion for Judgment on the Pleadings that the 335 Patent is Invalid under 35 U.S.C. 101, Document 27, *Blackbird Tech LLC d/b/a Blackbird Technologies*, v. *Fastly, Inc.*, Case No. 1:17-cv-00284-MSG, United States District Court for the District of Delaware, Sep. 15, 2017, 23 pages.

Order Granting Motion for Judgment on the Pleadings and Granting Motion to Dismiss, Document 87, *Blackbird Tech LLC*, v. *Cloudflare, Inc.*, Case No. 3:17-cv-06112-VC, United States District Court Northern District of California, Feb. 12, 2018, 2 pages.

* cited by examiner

INCORPORATING WEB APPLICATIONS INTO WEB PAGES AT THE NETWORK LEVEL

CROSS-REFERENCE TO RELATED APPLICATIONS

This application is a continuation of application Ser. No. 13/474,529, filed May 17, 2012, which is hereby incorporated by reference.

FIELD

Embodiments of the invention relate to the field of computer networks; and more specifically, to incorporating web applications into web pages at the network level.

BACKGROUND

A web page is made up of a number of objects including the HyperText Markup Language (HTML) of the page, the images, the CSS that defines the layout, etc. Many publishers (e.g., owners and/or operators of websites) incorporate one or more web applications (typically provided by third party application providers) into their web pages to provide additional functionality for the web pages. A web application is a piece of code (typically a script) that provides functionality to a web page. A common web application is a tracking and analytics application that generates statistics regarding the visitors of the web page.

A publisher typically has to manually insert the code of the web application into the page(s) that it desires to have that functionality. For example, in the case of a tracking and analytics application, the publisher typically adds the code for that application in several of its web pages. Web applications may periodically be updated by the web application providers (e.g., to correct an error, to provide additional functionality, to become more efficient, etc.). In order to update a web application, a publisher typically removes the code of the older web application and replaces it with the code of the newer web application. Adding and managing the web applications can become cumbersome for the customer, especially as the number of web applications increases.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

A method and apparatus for incorporating web applications into web pages at a network level is described. In one embodiment, a cloud-based proxy service allows publishers of websites (e.g., owner or operators of websites) to add web application(s) to one or more of their web pages without the publisher modifying the code of those pages, and in some embodiments, without the original pages being changed. In some embodiments, the cloud-based proxy service includes one or more web applications that may be selected by the publishers to be automatically deployed on one or more of their web pages as those web pages pass through a proxy server as they are being served to requesting clients. The code of the original web pages (stored on the origin server, for example) may not be modified, in some embodiments.

Figure 1:
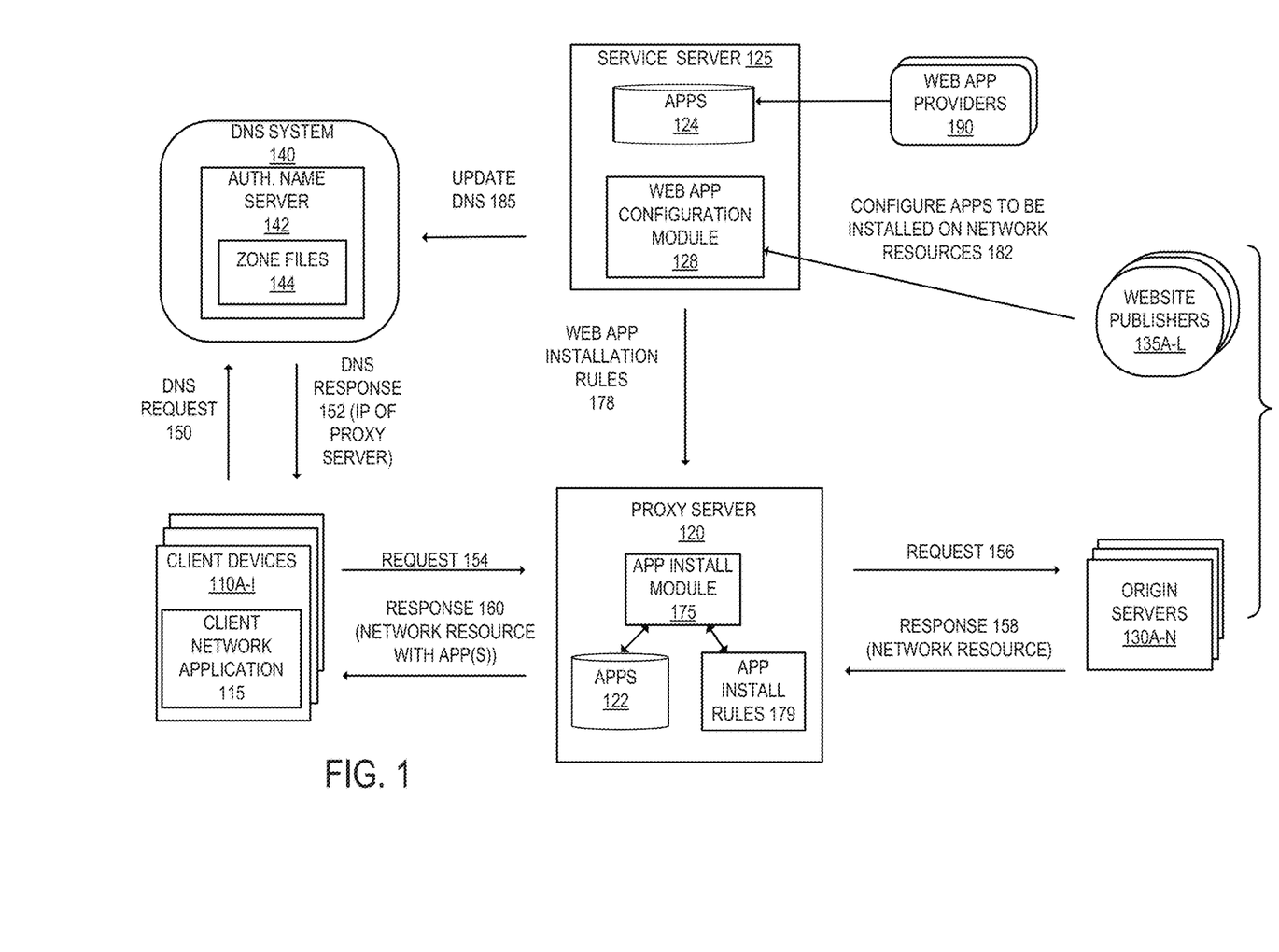
FIG. 1 illustrates an exemplary system for incorporating web applications into web pages at a network level according to one embodiment.

FIG. 1 illustrates an exemplary system for incorporating web applications into web pages at a network level according to one embodiment. FIG. 1 illustrates an example of a cloud-based proxy service that allows, among other things, website publishers to add web applications to their web page(s) at a network level and with minimal publisher interaction. A web application is a piece of software code that typically provides a service, feature, or other functionality to a web resource such as a web page. Example web applications include analytics applications that generate statistics regarding the visitors to the web page, affiliate link applications, monitoring applications, contextual search applications, translation applications, webmaster tools applications, support applications, malware/virus scan applications, game applications, library applications, website backup applications, testing applications, security monitoring applications, audio applications, loyalty programs applications, policy management applications, and widget applications (e.g., weather widgets that provide current weather, stock widgets that provide current stock information, sports widgets that provide current sports scores, news widgets that provide current news, etc.). Certain web applications may be visible on the web page (e.g., widget applications) while other web applications may not be visible on the web page (e.g., analytics applications). The web applications are typically installed within the Hyper Text Markup Language (HTML) of the web page by inserting the code for the web applications into the HTML. The web applications may be provided by third party web application providers 190 and/or by the organization that operates the cloud-based proxy service.

The cloud-based proxy service includes a set of proxy server(s) that are situated between the client computing devices 110A-I and the origin servers 130A-N and certain network traffic passes through the set of proxy server(s). The client computing devices 110A-I are computing devices (e.g., laptops, workstations, smartphones, palm tops, mobile phones, tablets, gaming systems, set top boxes, etc.) that are capable of accessing network resources. Each of the client devices 110A-I includes a client network application 115, which is configured for accessing network resources. Example client network applications include a web browser or other application that can access network resources. Users at the client computing devices 110A-I request network resources (e.g., web pages, images, word processing documents, PDF files movie files, music files, or other computer files) using the client network application.

The origin servers 130A-N are computing devices that serve network resources (e.g., web pages, images, word processing documents, PDF files movie files, music files, or other computer files). The origin servers 130A-N respond to requests for network resources from client network applications. Although not illustrated in FIG. 1, it should be understood that the network resources of the origin servers 130A-N may be stored separately from the device that responds to the requests. The origin servers 130A-N store the original web pages (those web pages that have not been updated to include the web applications that will be installed at the network level).

The proxy server 120 is a computing device that is situated between the client devices 110A-I and the origin servers 130A-N and provide some of the features for incorporating web applications in to the web pages of the origin servers 130A-N. For example, the proxy server 120 may receive requests for an action to be performed on an identified resource of an origin server (e.g., an HTTP GET request, an HTTP POST request, other HTTP request methods, or other requests to be applied to an identified resource on an origin server) from the client devices 110A-I. For example, the incoming request 154 is received at the proxy server 120. In some embodiments, the request is received at a proxy server 120 as a result of a DNS request 150 for the domain of the request resolving 152 to an IP address of the proxy server 120. For example, in such embodiments, the incoming request 154 is received at the proxy server 120 as a result of DNS resolution for a domain hosted at an origin server 130 resolving to the proxy server 120.

The proxy server 120 receives the response 158 from the origin server 130 that includes the requested network resource. After receiving the response 158, the proxy server 120 may determine to insert one or more web application(s) into the requested resource. For example, the proxy server 120 may be configured with web application installation rules 179 that indicate that one or more web applications are to be installed within the resource included in the response 158. The web application installation rules 179 may also indicate where in the resource that the web application(s) are to be installed. In one embodiment, the web application installation rules 179 are produced as a result of a publisher's configuration, which will be described in greater detail later herein. For example, the web application installation rules 179 stored in the proxy server 120 may be generated from the web application installation rules 178 that are received from the service server 125.

The web application installation module 175 of the proxy server 120 installs the web application(s) into the resource according to the application installation rules 179. The resource may be cached, either as modified with the added web application(s) and/or as the unmodified resource as received from the origin server. The proxy server 120 then transmits the response 160 to the requesting client device, the response including the requested resource that has been modified to include the added web application(s).

In one embodiment, the web application installation rules 179 are configured on the proxy server 120 as a result of publishers selecting one or more web applications to be installed on their web page(s) and/or web site. The website publisher(s) 135A-L own or control domains that are hosted on the origin servers 130A-N. The website publishers 135A-L may or may not own or control the origin servers 130A-N. For example, a publisher 135 may contract with a hosting provider that owns an origin server 130 that hosts at least some of the content of the domain of the publisher 135. In one embodiment, the domains owned/or controlled by the website publishers 135A-L point to the proxy server(s) 120. That is, a DNS query for any of those domains resolve to the proxy server(s) 120.

The DNS system 140 is used to refer to the DNS system as a whole and includes multiple DNS servers to resolve DNS requests. As illustrated, the DNS system 140 includes the authoritative name server 142, which is an authoritative name server for the service. The authoritative name server 142 may be the authoritative name server for the domains hosted at the origin servers 130A-N. It should be understood that the DNS system 140 may include more DNS servers (e.g., preferred domain servers, top-level domain name servers, or other domain servers) than illustrated. It should also be understood that there may be multiple authoritative web servers for the service and they may be geographically distributed. In one embodiment, the authoritative name servers for each the domains have been changed to the authoritative name server 142, which is associated with the service. It should be understood that the backup authoritative name servers serving the domains may also be changed. In one embodiment, the zone file records for the domains of the website publishers 135A-L are changed such that DNS resolution requests for those domains resolve to the proxy server 120. While FIG. 1 illustrates a single proxy server, it should be understood that there may be more proxy servers that may be geographically distributed.

The service server 125, operated by the service, provides a set of tools and interfaces for the website publishers 135A-L and is accessible over the Internet. For example, the service server 125, among other things, allows the website publishers 135A-L to register for the cloud-based proxy service and configure 182 web application(s) to be installed on network resources of their domains at the network level. Registering with the cloud-based proxy service may also cause the service server 125 to update the DNS record(s) 180 of the website publishers such that the domain(s) of the website publishers may resolve to one or more IP addresses of one or more proxy servers 120. The service server 125 may include the web application storage 124 to store the web applications provided by the web application providers 190 and/or the web applications provided by the service itself. As will be described in greater detail later herein, the service server 125 may distribute the web applications to the proxy server 120 for incorporation into web pages.

Figure 2:
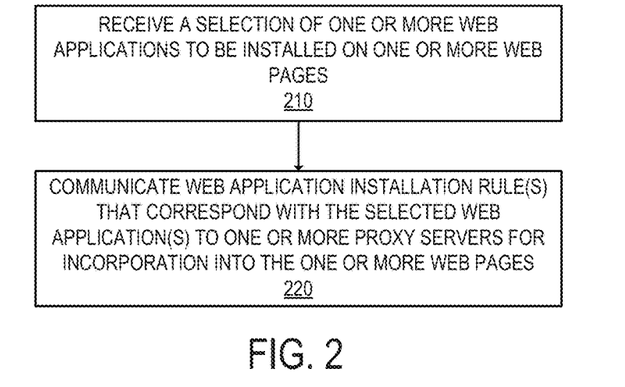
FIG. 2 is a flow chart that illustrates exemplary operations for configuring web application(s) to be installed on one or more network resource(s) of a website publisher according to one embodiment.

FIG. 2 is a flow chart that illustrates exemplary operations for configuring web application(s) to be installed on one or more network resource(s) of a website publisher according to one embodiment. In one embodiment, the operations described with reference to FIG. 2 are performed by the web application configuration module 128 of the service server 125. At operation 210, the web application configuration module 128 receives a selection of one or more web applications to be installed on one or more web pages. The selection may be received from one of the website publishers 135 and is applicable to one or more of their web pages. Flow moves from operation 210 to operation 220.

Figure 5:
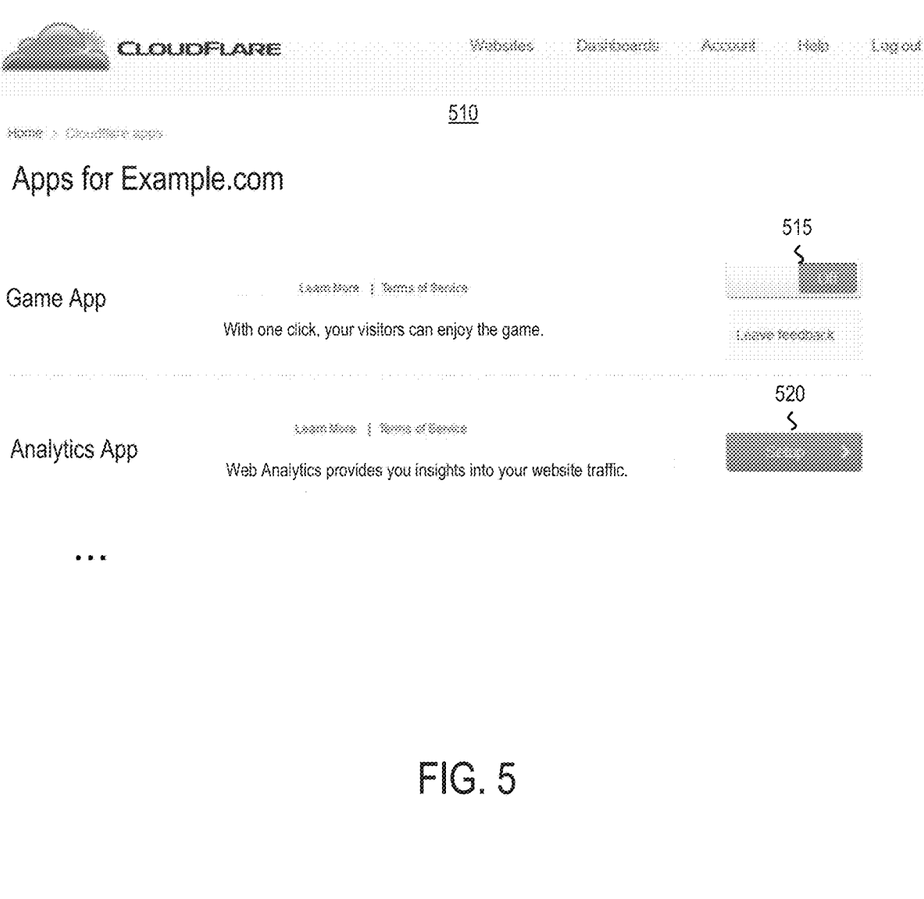
FIG. 5 illustrates an exemplary interface for the web application configuration module according to one embodiment.

FIG. 5 illustrates an exemplary interface for the web application configuration module 128 according to one embodiment. In one embodiment, the interface 510 is a website and is available to website publishers that are registered with the service. As illustrated in FIG. 5, the interface 510 is displayed for a website publisher that owns or controls the domain "example.com". The interface 510 includes a listing of web applications that may be installed. Although FIG. 5 illustrates two web applications (a game web application and an analytics web application), it should be understood that there may be many more web applications and/or different web applications. In some embodiments, website publishers can search for web applications based on category, name, popularity, etc. In some embodiments, the cloud-based proxy service reviews each of the web applications for security implications. If a vulnerability in a web application is discovered, it may be disabled until that vulnerability is resolved.

Some web applications may be installed with a single click or selection and without the publisher configuring the web application or changing the code of their web pages. For example, as illustrated in FIG. 5, the game web application may be installed as a result of the publisher selecting the button 515, which acts as a toggle switch.

Some web applications may require additional setup or configuration information from the website publishers. By way of example, as illustrated in FIG. 5, the analytics web application may require additional setup beyond a simple enable or disable. For example, the analytics web application may require the website publisher to input a tracking identifier. As another example, some web applications may require an account or payment to be established with the web application provider. As a result of selecting the setup button 520, the interface 510 prompts the website publisher for configuration information in order to install the web application. For example, the information may include one or more fields to allow the website publisher to register for an account with the web application provider, which may include setting up payment information for the web application. In some cases, in response to a website publisher selecting a web application to be installed that requires an account, the service server 125 may automatically transmit account information for the website publisher to the web application provider to automatically create an account for the website publisher. As yet another example, some web applications may require a change to the DNS infrastructure of the website publisher. In some embodiments, the service server 125 may automatically make the required change to the DNS infrastructure of the website publisher for a particular web application in response to the website publisher enabling that web application. After enabling a web application, the web application will be installed into the web pages for example.com as those web pages pass through the proxy server 120 and are delivered to the client computing devices.

Although not illustrated in FIG. 5, in some embodiments, website publishers may select web application(s) to be applied to only certain pages of their website. For example, the website publisher that owns or controls the domain "example.com" may choose to install certain web application(s) on certain pages. For example, the website publisher may choose to install the game application on "example.com/blog" and install the analytics application on "example.com/blog" and "example.com/news". The website publisher may also cause the web application(s) to be installed on each of their pages. For example, the website publisher may want an analytics web application to be installed on each of their pages. As another example, the website publisher may choose to install web application(s) on one or more pages using regular expression matching (e.g., wildcard characters). By way of a specific example, publisher may choose to install web application(s) on pages matching the following pattern: "example.com/blog/*" (which would match, for example, "example.com/blog/1", and "example.com/blog/2").

Referring back to FIG. 2, at operation 220, the web application configuration module 128 communicates a set of one or more web application installation rules 178 that correspond with the selected web applications to one or more proxy servers 120 for incorporation into web page(s) of the website publisher. The web application installation rules 178 indicate the selected web applications that are to be incorporated into the selected web page(s) of the website publisher as those web page(s) are passed through the proxy server and delivered to requesting client computing devices. The web application installation rules 178 may also indicate the position in the code of those web page(s) in which those web application(s) are to be installed. The service server 125 may also communicate the selected web application(s) to those proxy servers 120 (e.g., in cases where the proxy servers 120 do not have the selected web application(s)).

Figure 3:
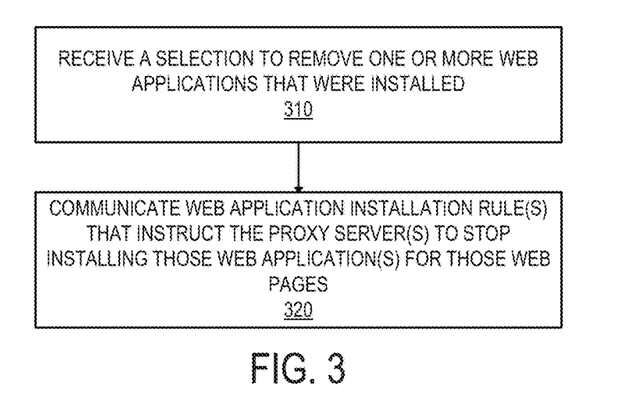
FIG. 3 is a flow diagram that illustrates exemplary operations for a website publisher to remove web application(s) that have previously been configured to be installed on network resource(s) of that publisher according to one embodiment.

In some embodiments, the web application(s) that are selected by the website publisher for one or more of their web pages will be installed into their web pages until the website publisher chooses to remove those web application(s) (e.g., by selecting a remove button or toggle button). Website publishers may also use the web application configuration module 128 to remove web application(s) that have been previously configured to be installed on one or more of their network resource(s). For example, FIG. 3 is a flow diagram that illustrates exemplary operations for a website publisher to remove web application(s) that have previously been configured to be installed on network resource(s) of that publisher. At operation 310, the web application configuration module 128 receives a selection to remove one or more web applications that were previously configured to be installed on one or more network resources of that publisher. For example, with reference to FIG. 5, assuming that the game application is configured to be installed at the network level, the publisher may select the button 515 (which acts as a toggle switch) to cause the game application from thereafter being installed on its web pages. Flow then moves to operation 320 and the web application configuration module 128 communicates to the proxy server(s) that are currently adding those web applications to web pages, a set of one or more web application installation rules 178 that instruct those proxy server(s) to stop adding those web applications to those web pages.

In some cases, web applications may periodically be updated by the web application providers (e.g., to correct an error, to provide additional functionality, etc.). In one embodiment, updates to web applications are automatically transmitted to the proxy servers such that the proxy servers incorporate the most current version of those web applications.

Figure 4:
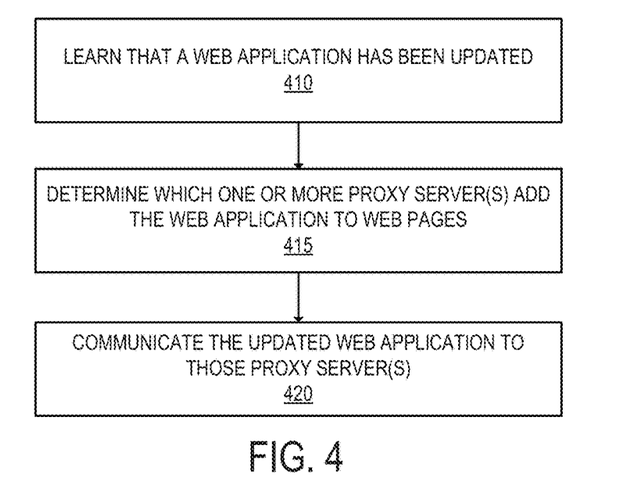
FIG. 4 is a flow diagram that illustrates exemplary operations for updating a web application at a network level according to one embodiment.

For example, FIG. 4 is a flow diagram that illustrates exemplary operations for updating a web application at a network level according to one embodiment. At operation 410, the service server 125 learns that a web application has been updated. For example, the web application provider has updated the code of the web application and notified the service that the web application has been updated. As another example, the web application provider has submitted a new version of the web application to the service server 125. The service server 125 may store the new version of the web application in the web application storage 124.

Flow then moves to operation 415 and the service server 125 determines which of the proxy server(s) 120 are currently installing that web application in web pages. Next, the service server 125 communicates the updated web application to those proxy server(s) 120 at operation 420. In another embodiment, the service server 125 communicates the updated web application to each of the proxy server(s) 120. Thus, the web application(s) that are installed through the service may be kept up to date by the service. Therefore, website publishers, who typically would have had to manage their own code and update their code with the update (e.g., remove the older version of the web application from each of their web pages and replace with the updated version, which is a time consuming process), are not required to manage the updates of the web applications in embodiments described herein.

In addition, in some embodiments, upon learning that a particular web application has a vulnerability, the service server 125 may cause that web application to be disabled until the vulnerability is patched. For example, the service server 125 transmits web application installation rules to the proxy servers that indicates that that web application should not be installed. Responsive to the vulnerability being patched, the service server 125 transmits web application installation rules to the proxy servers that indicates that the web application may be installed again, and optionally transmits the patched web application to the proxy servers.

Figure 6:
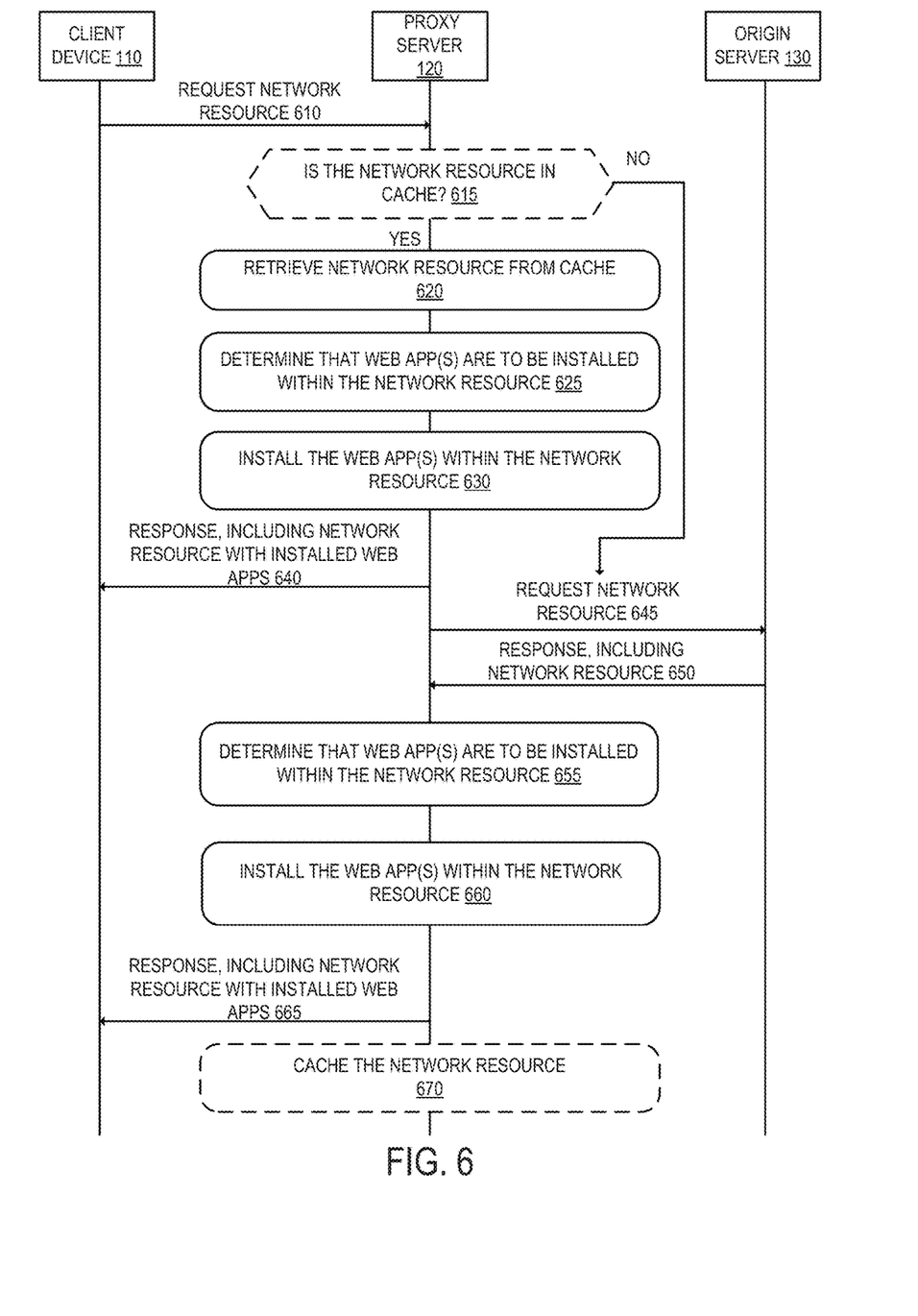
FIG. 6 is a flow diagram that illustrates exemplary operations for automatically installing a web application at the network level as it passes through a proxy server according to one embodiment.

FIG. 6 is a flow diagram that illustrates exemplary operations for automatically installing a web application at the network level as it passes through a proxy server according to one embodiment. The operations of FIG. 6 will be described with reference to the exemplary embodiment of FIG. 1. However, it should be understood that the operations of FIG. 6 can be performed by embodiments of the invention other than those discussed with reference to FIG. 1, and the embodiments discussed with reference to FIG. 1 can perform operations different than those discussed with reference to FIG. 6. In one embodiment, at the time the operations described in FIG. 6 are performed, the proxy server 120 has received web application installation rules as configured by a website publisher.

At operation 610, the proxy server 120 receives a request for a network resource from a client computing device 110. For example, the request is an HTTP request for a file at example.com (e.g., example.com/index.html). Flow then moves to operation 615 (which is optional in some embodiments), where the proxy server 120 determines whether the requested network resource is in its cache. If it is, then flow moves to operation 620. If it is not, then flow moves to operation 645.

At operation 620, the proxy server 120 retrieves the network resource from its cache. In this example, the retrieved network resource does not include the web applications that have been configured by the website publisher to be added to the network resource at the network level. However, in other embodiments, the cached network resource may include the added web applications. Flow then moves to operation 625 and the proxy server 120 determines that one or more web applications are to be installed within the retrieved network resource. For example, the proxy server 120 determines to install one or more web applications based on whether the web application installation rules 179 indicate that one or more web applications are to be installed in the requested network resource (e.g., example.com/index.html). In one embodiment, the decision is based on the URL of the requested network resource. In this example, at least one web application is to be installed in the requested network resource. Flow moves from operation 625 to operation 630.

At operation 630 the proxy server 120 installs the one or more web applications into the retrieved network resource. Installing the web application(s) will be described in more detail with respect to FIG. 7. Flow then moves to operation 640 where the proxy server 120 forms a response that includes the network resource with the installed web application(s) and transmits the response to the client computing device 110.

At operation 645, the proxy server 120 transmits a request to the origin server 130 for the network resource that was requested at operation 610. Assuming that the origin server 130 has access to the requested network resource, the origin server 130 transmits a response to the proxy server 120 that includes the requested resource at operation 650 (e.g., the network resource example.com/index.html). This network resource is referred to as the original network resource in this example. Flow then moves to operation 655.

At operation 655, the proxy server 120 determines that one or more web applications are to be installed within the network resource. For example, the proxy server 120 determines to install one or more web applications based on whether the web application installation rules indicates that one or more web applications are to be installed in the network resource. Flow moves from operation 655 to operation 660.

At operation 660, the proxy server 120 installs the one or more web applications into the network resource. For example, the proxy server 120 accesses the local web application storage 122 for the web application(s) and inserts the code for those web application(s) into the network resource. Installing the web application(s) will be described in more detail with respect to FIG. 7. In this example, the network resource is modified at the network level. That is, the network resource is modified as it passes through the proxy server 120. The original network resource (stored, for example, on the origin server 130) is not modified and does not include the web application(s).

Flow then moves to operation 665 where the proxy server 120 forms a response that includes the network resource that has been modified to include the installed web application(s) and transmits the response to the client computing device 110. Flow then moves to operation 670, which is optional, where the proxy server 120 caches the network resource. In some embodiments, the proxy server 120 caches the network resource that has been modified to include the web application(s). In other embodiments, the proxy server 120 caches the network resource in its original form (as it was received from the origin server 130).

Figure 7:
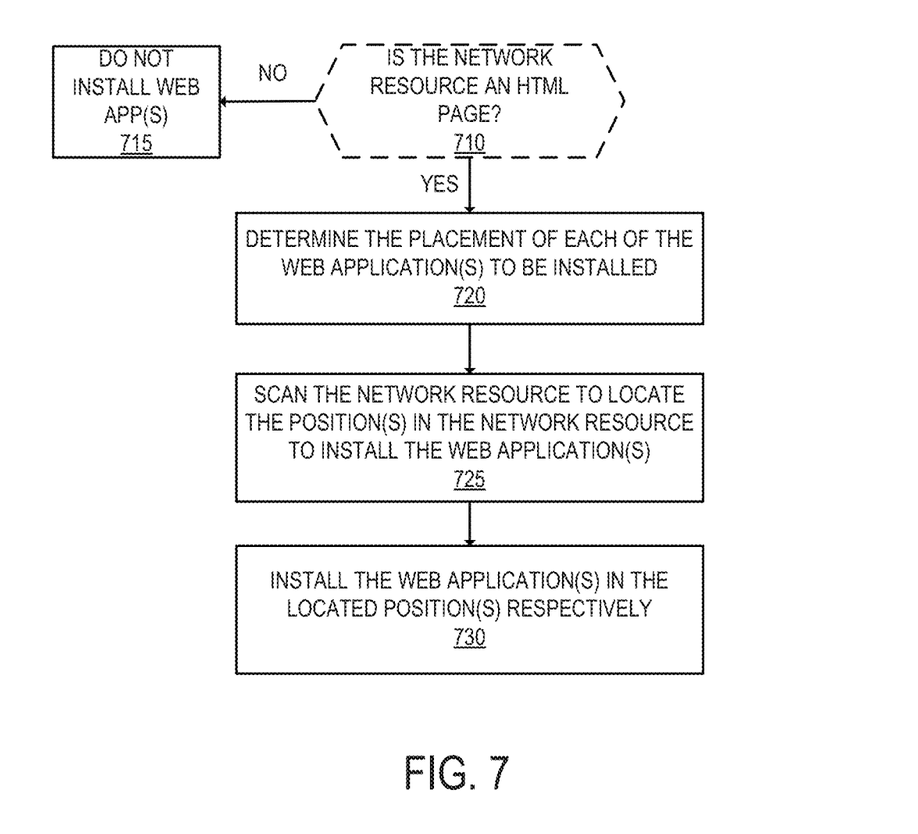
FIG. 7 is a flow diagram that illustrates exemplary operations for installing a web application in a network resource according to one embodiment.

FIG. 7 is a flow diagram that illustrates exemplary operations for installing a web application in a network resource according to one embodiment. The operations of FIG. 7 will be described with reference to the exemplary embodiment of FIG. 1. In particular, the operations of FIG. 7, will be described with reference to the web application installation module 175 of the proxy server 120. However, it should be understood that the operations of FIG. 7 can be performed by embodiments of the invention other than those discussed with reference to FIG. 1, and the embodiments discussed with reference to FIG. 1 can perform operations different than those discussed with reference to FIG. 7. In one embodiment, the operations described with reference to FIG. 7 are performed on network resources that are HTML documents. In one embodiment, the operations described with reference to FIG. 7 are performed after a determination has been made to install one or more web applications into a network resource.

In one embodiment, the proxy server 120 only includes web application(s) in HTML pages. Thus, at operation 710, the web application installation module 175 determines whether the network resource is an HTML page. For example, the web application installation module 175 may examine the filename to see whether it has an HTML extension and/or examine the content-type header of the HTTP response to see whether it corresponds with an HTML document (e.g., "text/html"). However, there are occasions where the filename has an HTML extension and/or the content-type header indicates that the resource is an HTML document, but the resource is not actually an HTML document (this is typically due to a misconfiguration of the origin server). To guard against this, in some embodiments, the web application installation module 175 analyzes at least part of the resource (typically the beginning of the resource) to determine whether it is consistent with an HTML document. For example, the web application installation module 175 may analyze the resource to look for something that looks like an HTML tag (e.g., <head>), which may be an indication that the reference is an HTML document. If, for example, the first bytes are binary values, which is common for images, the web application installation module 175 may determine that it is not an HTML document. If the web application installation module 175 determines that the resource is not an HTML page, then flow moves to block 715 and web application(s) are not installed within the network resource (the unmodified resource may be transmitted to the requesting client computing device). If the web application installation module 175 determines that the resource is an HTML page, then flow moves to operation 720.

In one embodiment, each of the web application(s) that are to be installed within a network resource has an optimal location within the network resource to be installed (e.g., the beginning of the page, the end of the page, at a particular tag in the page, etc.). For example, an analytics application may be recommended to be placed at the bottom of the <head> section of the HTML document to increase the likelihood that the tracking information will be sent before the user leaves the page (as opposed to including the application in a location that will be processed after the page is otherwise rendered). In some embodiments, the developers of the web application (which may be a third party developer or the service) determines the optimal placement of the network resource in HTML pages and communicates this to the service. By way of example, the web application(s) may be inserted in a few different locations of the HTML page, including immediately after the opening HTML tag, immediately after the opening head tag, immediately before the closing head tag, immediately after the final state (e.g., the final state may be after the closing head tag, closing HTML tag, or the end of file, whichever is found first); and immediately after the opening tag.

At operation 720, the web application installation module 175 determines the placement in the network resource for each of the web application(s) that are to be installed. For example, the web application installation module 175 accesses the web application installation rules 179 to determine the placement for those web applications that are to be installed.

Flow then moves to operation 725 and the web application installation module 175 scans the network resource to locate the position(s) in the network resource for the web application(s). In one embodiment, the web application installation module 175 uses a lightweight parser (not a full parser like those that are included in a web browser) to locate the position(s) in the network resource for the web application(s). In one embodiment the lightweight parser is a state machine with several different states that is used when traversing through the network resource for locating the position(s) in the network resource to install the web application(s). The states may include an HTML state (which is the beginning state), a string state, the inside of a script state, the inside of a tag state, and the inside of a string that is inside a tag state. The states are useful for determining where in the page the parser is. For example, if the web page is a tutorial about writing HTML, then the actual content of the HTML may have something that looks like an HTML tag. The state machine allows the web application installation module 175 to verify, for example, that it has located a real HTML tag versus a string that looks like an HTML tag. The state machine also allows the web application installation module 175 to be more efficient than a full parser that is normally found in web browsers. For example, unlike a parser for a browser which is interested in how the pages are constructed and may have to wait to process until all parts of the response are received, the state machine of the web application installation module 175 may process the parts of the response as they are received and if they do not include the position for the web application to be installed they may be streamed to the client computing device. For example, if in a string state, the parser may look for the end of the string and stream back the parts of the response in the string until the end of the string is reached.

Flow moves from operation 725 to operation 730 where the web application installation module 175 installs the web application(s) in the located position(s) respectively. For example, the web application installation module 175 accesses the code for the web application(s) from the local web application storage 122 and inserts those web application(s) into the network resource.

In some cases, the original network resource may include a version of a web application that is to be installed. The version may be an older version of the web application, it may be in a non-optimal location, etc. Having multiple versions of the web application in the same network resource may not be desirable as it may cause conflicts to occur or other unexpected errors to occur. In some embodiments, the web application installation module 175 scans the original network resource to determine whether it includes a version of the web application that is to be installed. If it is, then the web application installation module 175 removes that web application from the network resource. The web application installation module 175 will insert the web application that it has received from the web application provider into the network resource.

While embodiments have been described with reference to a website publisher using a service server or other configuration server to configure the web application(s) to be installed on one or more of their pages, in alternative embodiments a web application installer that is a frame or other element is inserted into a page of the publisher and allows that publisher to select web application(s) to be installed on that page, on similar pages, or on pages matching a defined pattern. For example, the proxy server 120 may insert the code for the web application installer into the HTML of the page "example.com" such that when the publisher of "example.com" browses to that page, the web application installer may be displayed to the publisher.

The web application installer may be restricted for being displayed only to the publisher. For example, in one embodiment, a cookie is set when the publisher logs into the service server 125 or otherwise registers for service for their domain. This cookie is referred to as the publisher identifier cookie. If the proxy server 120 receives a request with a valid publisher identifier cookie for a domain (e.g., a cookie that identifies that the request is being received from the publisher of the page being requested), the proxy server 120 inserts the code for the web application installer into the HTML of the requested page. In another embodiment, the website publisher can navigate to one or more of their pages in a web application configuration mode via the service server 125. In the web application configuration mode, the proxy server 120 inserts the web application installer into the HTML of the navigated code. For example, the web application configuration module 128 of the service server 125 may include a link to the web page(s) of the publisher. When a link for a page is selected, the web application installer is displayed to the publisher within that page.

In one embodiment, the proxy server 120 inserts the web application installer within a page only after determining that the visitor is authorized (e.g., the visitor is the publisher, as determined by either the request including the publisher identifier cookie or the page being displayed as a result of selection of a link displayed through the web application configuration module). In another embodiment, the proxy server 120 inserts the web application installer into the page and it is only displayed or activated after determining that the visitor is authorized.

In some embodiments, the web application configuration module 128 of the service server 125 and/or the web application installer may allow the publisher to specify the placement of any visual part of a web application onto the page. For example, the web application configuration module 128 and/or the web application installer may allow the publisher to select where a web application should be displayed on the web page (e.g., left edge, right edge, top edge, bottom edge, etc.). In some embodiments, the web application configuration module 128 and/or the web application installer includes pre-defined locations (e.g., left edge, right edge, top edge, bottom edge) that the publisher may select to toggle between locations.

The publisher may configure the web application to be installed in different locations on the page for different requesting client devices. For example, the publisher may configure a certain web application to be displayed on the bottom of the page for mobile devices (e.g., smartphones, tablets, etc.) and displayed in a different location for non-mobile devices.

In other embodiments, the web application configuration module 128 and/or the web application installer may include a graphical user interface component that allows for the visual placement of a web application onto the page (e.g., drag and drop a web application onto the page). For example, the publisher selects a web application to be displayed on certain pages (e.g., a web application that displays sports scores). The publisher may select the conditions for displaying the web application (e.g., what page(s) to display the application on, what devices (e.g., as indicated by user agent) will display the web application, etc.). The publisher drags the web application into place where it should be displayed to users.

Once the publisher submits the configuration (e.g., by selecting a submit button), the server (either the service server 125 or the proxy server 120) stores a location within the Document Object Model (DOM) where the web application should appear based on the selection of the publisher. By way of example, the algorithm for storing the location within the DOM where the web application should appear may be demarcated based on the absolute position of the page (e.g., number of pixels from an edge of the page); based on relative positioning to the elements around it (e.g., based on the potential selectors ID/Class of parent/child elements); or based on the XPath location within the DOM tree (e.g., HTML→BODY→First<DIV>→Second<P>), or some combination of the above. The algorithm may be strict and place the web application only if the exact position is found or it may be loose and place the application in the element that most closely resembles the specified position.

The server may update the web application installation rules with the location where the web application(s) should appear. For example, the service server 125 may update the web application installation rules 178 with the location where the web application(s) should appear, and communicate those rules to the proxy server 120.

While the above example describes adding a web application onto the page, the publisher may use the graphical user interface component to move the placement of existing web applications and/or remove existing web applications from one or more of their pages.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the figures can be implemented using code and data stored and executed on one or more electronic devices (e.g., a client computing device, a proxy server, a service server, etc.). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable communication media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory computer-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment of the invention may be implemented using different combinations of software, firmware, and/or hardware.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method in a proxy server for automatically including a plurality of web applications on a web page, the method comprising the following operations performed by the proxy server:
    receiving an instruction to install the plurality of web applications in the web page, wherein the instruction is received as a result of an owner or operator of the web page selecting to install the plurality of web applications for at least the web page;
    receiving, from a client device, a request for the web page, wherein the request is received at the proxy server as a result of a Domain Name System (DNS) request for a domain of the web page resolving to the proxy server instead of an origin server handling the domain, wherein the origin server is one of a plurality of origin servers that resolve to the proxy server and are owned by different entities;
    retrieving the requested web page, wherein at a time when the requested web page is retrieved, that web page does not include the plurality of web applications;
    determining, based on the received instruction, that the plurality of web applications are to be installed within the web page;
    automatically modifying the retrieved web page to include the plurality of web applications; and
    transmitting a response to the client device, the response including the modified web page.

2. The method of claim 1, wherein automatically modifying the retrieved web page to include the plurality of web applications includes the proxy server performing the following:
    for each of the plurality of web applications, performing the following:
        determining a position in the retrieved web page for that web application,
        scanning the retrieved web page to locate the determined position, and
        inserting the web application at the located position.

3. The method of claim 1, wherein retrieving the requested web page includes performing the following operations:
    transmitting a request for the web page to the origin server; and
    receiving, from the origin server, a response that includes the web page.

4. The method of claim 1, wherein retrieving the requested web page includes performing the following operation:
    accessing a cache to retrieve the web page.

5. The method of claim 1, wherein the plurality of web applications includes two or more of the following: an analytics application, an affiliate link application, a monitoring application, a contextual search application, a translation application, a webmaster tools application, a support application, a malware/virus scan application, a game application, a library application, a website backup application, a testing application, a security monitoring application, an audio application, a loyalty program application, and a policy management application.

6. The method of claim 1, further comprising:
    receiving the plurality of web applications.

7. A method for configuring a plurality of web applications to be installed on a set of one or more web pages of a website publisher at a network level, the method comprising:
    providing an interface for the website publisher to select the plurality of web applications to be installed on the set of one or more web pages of the website publisher at the network level;
    receiving, through the interface, a selection of the plurality of web applications to be installed on the set of one or more web pages of the website publisher at the network level, wherein the received selection includes for at least one of the plurality of web applications only a single enable selection; and
    communicating, to a proxy server, a set of one or more web application installation rules that indicate that the plurality of web applications are to be installed within the set of web pages as the set of web pages are passed through the proxy server and delivered to requesting client computing devices as a result of a Domain Name System (DNS) request for a domain of the set of web pages resolving to the proxy server instead of an origin server handling the domain, wherein the origin server is one of a plurality of origin servers that resolve to the proxy server and are owned by different entities, wherein the set of web pages do not include the plurality of web applications when they are received at the proxy server.

8. The method of claim 7, further comprising: communicating, to the proxy server, the plurality of web applications that are to be installed.

9. The method of claim 8, further comprising:
    responsive to learning that one of the plurality of web applications has been updated, communicating, to the proxy server, the updated web application.

10. The method of claim 7, wherein, the set of web application installation rules further indicate a position in code of the set web pages for each of the plurality of web applications to be installed.

11. The method of claim 7, wherein the plurality of web applications are provided by a different entity than the website publisher.

12. The method of claim 7, wherein the plurality of web applications includes two or more of the following: an analytics application, an affiliate link application, a monitoring application, a contextual search application, a translation application, a webmaster tools application, a support application, a malware/virus scan application, a game application, a library application, a website backup application, a testing application, a security monitoring application, an audio application, a loyalty program application, and a policy management application.

13. The method of claim 7, wherein the proxy server is owned and operated by a different entity than the website publisher.

14. A non-transitory computer-readable storage medium that provides instructions that, if executed by a processor of a proxy server, will cause said processor to perform operations for automatically including a plurality of web applications on a web page, comprising:
receiving an instruction to install the plurality of web applications in the web page, wherein the instruction is received as a result of an owner or operator of the web page selecting to install the plurality of web applications for at least the web page;
receiving, from a client device, a request for the web page, wherein the request is received at the proxy server as a result of a Domain Name System (DNS) request for a domain of the web page resolving to the proxy server instead of an origin server handling the domain, wherein the origin server is one of a plurality of origin servers that resolve to the proxy server and are owned by different entities;
retrieving the requested web page, wherein at a time when the requested web page is retrieved that web page does not include the plurality of web applications;
determining, based on the received instruction, that the plurality of web applications are to be installed within the web page;
automatically modifying the retrieved web page to include the plurality of web applications; and
transmitting a response to the client device, the response including the modified web page.

15. The non-transitory computer-readable storage medium of claim 14, wherein automatically modifying the retrieved web page to include the plurality of web applications includes performing the following:
for each of the plurality of web applications, performing the following:
determining a position in the retrieved web page for that web application,
scanning the retrieved web page to locate the determined position, and
inserting the web application at the located position.

16. The non-transitory computer-readable storage medium of claim 14, wherein retrieving the requested web page e includes performing the following operations:
transmitting a request for the web page to the origin server; and
receiving, from the origin server, a response that includes the web page.

17. The non-transitory computer-readable storage medium of claim 14, wherein retrieving the requested web page includes performing the following operation:
accessing a cache to retrieve the web page.

18. The non-transitory computer-readable storage medium of claim 14, wherein the plurality of web applications includes two or more of the following: an analytics application, an affiliate link application, a monitoring application, a contextual search application, a translation application, a webmaster tools application, a support application, a malware/virus scan application, a game application, a library application, a website backup application, a testing application, a security monitoring application, an audio application, a loyalty program application, and a policy management application.

19. The non-transitory computer-readable storage medium of claim 14, wherein the non-transitory computer-readable storage medium further provides instructions that, when executed by the processor of the proxy server, cause said processor to perform operations comprising:
receiving the plurality of web applications.

20. A non-transitory computer-readable storage medium that provides instructions that, if executed by a processor, will cause said processor to perform operations comprising:
providing an interface for a website publisher to select a plurality of web applications to be installed on a set of one or more web pages of the website publisher at a network level;
receiving, through the interface, a selection of the plurality of web applications to be installed on the set of one or more web pages of the website publisher at the network level, wherein the received selection includes for at least one of the plurality of web applications only a single enable selection; and
communicating, to a proxy server, a set of one or more web application installation rules that indicate that the plurality of web applications are to be installed within the set of web pages as the set of web pages are passed through the proxy server and delivered to requesting client computing devices as a result of a Domain Name System (DNS) request for a domain of the set of web pages resolving to the proxy server instead of an origin server handling the domain, wherein the origin server is one of a plurality of origin servers that resolve to the proxy server and are owned by different entities, wherein the set of web pages do not include the plurality of web applications when they are received at the proxy server.

21. The non-transitory computer-readable storage medium of claim 20, wherein the non-transitory computer-readable storage medium further provides instructions that, when executed by the processor of the proxy server, cause said processor to perform operations comprising:
communicating, to the proxy server, the plurality of web applications that are to be installed.

22. The non-transitory computer-readable storage medium of claim 21, wherein the non-transitory computer-readable storage medium further provides instructions that, when executed by the processor of the proxy server, cause said processor to perform operations comprising:
responsive to learning that one of the plurality of web applications has been updated, communicating, to the proxy server, the updated web application.

23. The non-transitory computer-readable storage medium of claim 20, wherein, the set of web application installation rules further indicate a position in code of the set web pages for each of the plurality of web applications to be installed.

24. The non-transitory computer-readable storage medium of claim 20, wherein the plurality of web applications are provided by a different entity than the website publisher.

25. The non-transitory computer-readable storage medium of claim 20, wherein the plurality of web applications includes two or more of the following: an analytics application, an affiliate link application, a monitoring application, a contextual search application, a translation application, a webmaster tools application, a support application, a malware/virus scan application, a game application, a library application, a website backup application, a testing application, a security monitoring application, an audio application, a loyalty program application, and a policy management application.

26. The non-transitory computer-readable storage medium of claim 20, wherein the proxy server is owned and operated by a different entity than the website publisher.

* * * * *